United States Patent [19]

Hempelmann

[11] Patent Number: 4,943,121
[45] Date of Patent: Jul. 24, 1990

[54] WHEEL TRIM

[75] Inventor: Heinrich J. Hempelmann, Livonia, Mich.

[73] Assignee: Ni Industries, Inc., Novi, Mich.

[21] Appl. No.: 145,513

[22] Filed: Jan. 19, 1988

[51] Int. Cl.$^5$ ............................................. B60B 7/06
[52] U.S. Cl. ............................. 301/37 SS; 301/37 SC
[58] Field of Search ............... 301/37 R, 37 S, 37 SS, 301/37 SC, 37 P, 37 CM

[56] References Cited

U.S. PATENT DOCUMENTS

| | | | |
|---|---|---|---|
| 2,107,015 | 2/1938 | Short | 150/54 |
| 2,159,881 | 5/1939 | Booth | 301/37 R |
| 2,175,353 | 10/1939 | Jacobi | 70/169 |
| 3,170,733 | 2/1965 | Lamme | 301/37 R |
| 3,317,247 | 5/1967 | Lamme | 301/37 R |
| 3,534,570 | 10/1970 | Mauro | 70/167 |
| 4,067,621 | 1/1978 | Reppert | 301/108 A |
| 4,452,493 | 6/1984 | Liggett | 301/37 SS |
| 4,463,990 | 8/1984 | Beisch | 301/37 SS |
| 4,576,415 | 3/1986 | Hempelmann | 301/37 S |
| 4,749,234 | 6/1988 | Hempelmann | 301/37 SS X |

FOREIGN PATENT DOCUMENTS

| | | | |
|---|---|---|---|
| 2169250 | 7/1986 | United Kingdom | 301/37 SS |
| 2174043 | 10/1986 | United Kingdom | 301/37 SS |
| 2174650 | 11/1986 | United Kingdom | 301/37 SS |

Primary Examiner—Russell D. Stormer
Attorney, Agent, or Firm—Harness, Dickey & Pierce

[57] ABSTRACT

A wheel trim assembly including a plurality of radial extending spoke members is characterized by a plate integrally formed from a polymeric material and includes an arrangement disposed between the plate and vehicle wheel for inhibiting rotation of a lock nut centrally of the plate the nut adapted to releasably engage a threaded spindle from the vehicle wheel to retain the plate thereto, and a spoke retention arrangement for captivating the inward radial ends of a first and second plurality of spoke members, respectively, on a first and second axial layer. The center retention contemplates a separate lock collar being insertably, nonrotatably captivated within a central plate opening and the integral arrangement for inhibiting rotation of the lock nut rotatably disposed therewithin.

17 Claims, 4 Drawing Sheets

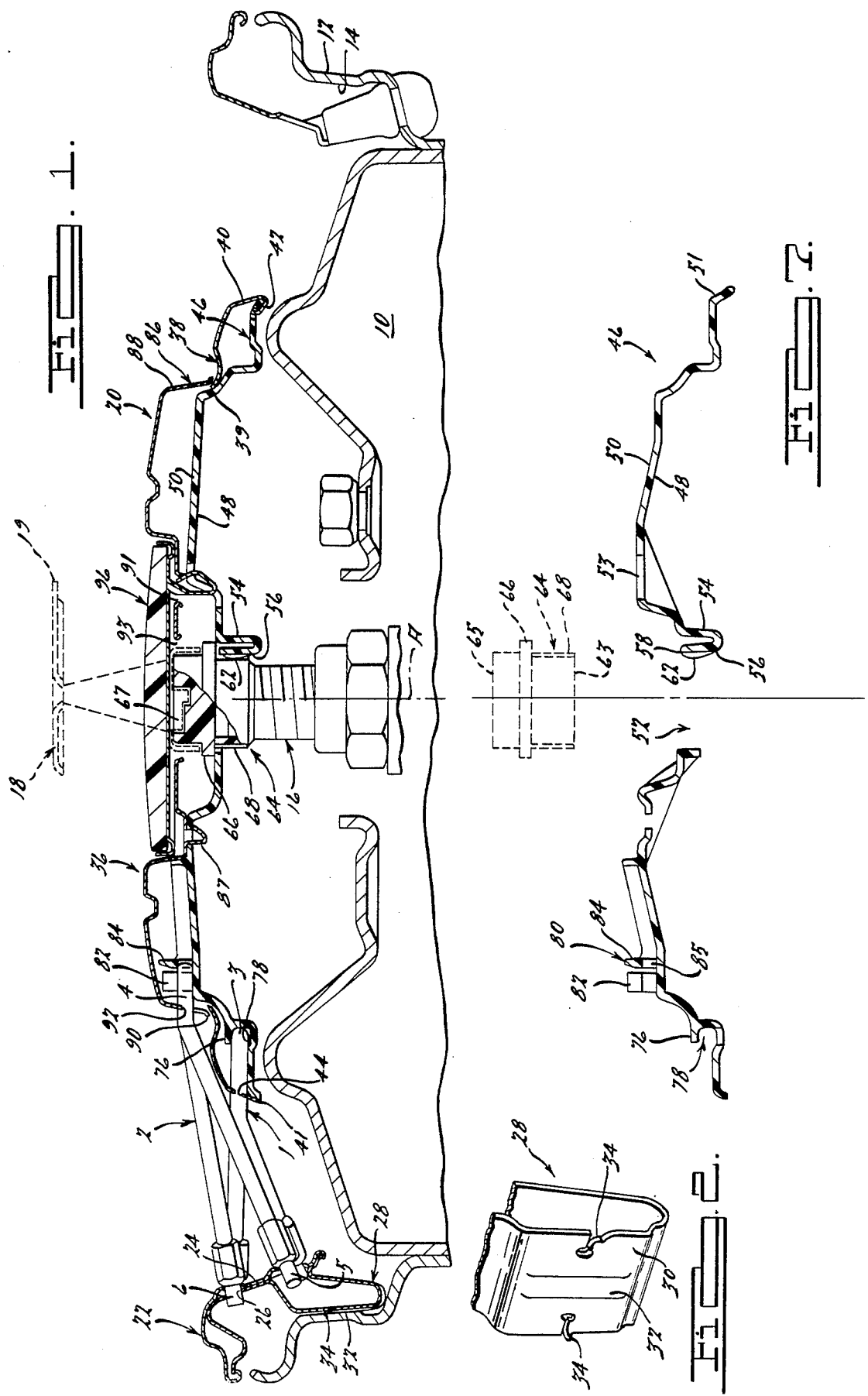

WHEEL TRIM

This invention relates generally to wheel trim and more specifically to an improved center retention system therefor, as well as to an improved technique for assembling simulated wheel trim.

Wheel trim have long been employed to ornamate the axially outwardly facing surface of vehicle wheels in order to enhance the overall appearance of the motor vehicle. Typically such decorative wheel trim are offered as additional cost options when purchasing a motor vehicle and are often relatively costly and hence subject to theft.

In order to reduce the likelihood of theft of such wheel trim, at least one wheel trim manufacturer has designed and now utilizes a center lock retention system which comprises cooperating central fastening means employing a threaded shaft secured to and extending axially outwardly from the vehicle wheel which cooperates with a lock nut provided on the wheel trim so as to retain and position the wheel trim on the vehicle wheel. A cooperating anti-rotation clip can be included to inhibit rotation of the lock nut with respect to the wheel trim whereby to inhibit unwanted removal of the wheel trim from the vehicle wheel. Such center retention arrangements are disclosed in application Ser. Nos. 347,683, filed Feb. 11, 1982 and now U.S. Pat. No. 4,723,818, and 812,072, filed Dec. 23, 1985 now U.S. Pat. No. 4,749,234, and in U.S. Pat. No. 4,683,629, issued Aug. 4, 1987, the disclosure of each being expressly incorporated herein by reference. Additionally, an arrangement for inhibiting unwanted rotation of both the wheel trim and a central lock bolt with respect to a lock bracket secured to the vehicle wheel is shown in U.S. Pat. No. 4,576,415, issued Mar. 18, 1986, the disclosure thereof being expressly incorporated herein by reference.

Since fuel economy of a vehicle is directly related to the gross weight of the vehicle, auto manufacturers are constantly under pressure to reduce the weight of components used in vehicles. Accordingly, it would be desirable to reduce the weight of the vehicle wheel trim. While exterior surfaces of the trim made for appearance and/or ornamentation purposes in some applications still rely on metal, other components could be comprised of lighter weight material.

Accordingly, the present invention incorporates a relatively simple, easily fabricated retention arrangement which is designed to be easily and conveniently secured to the wheel trim member and includes an anti-rotation arrangement acting on a center lock nut threadably engageable with a shaft extending from a vehicle shaft and retention clips extending from the periphery of the trim member engaging an annular shoulder of the vehicle wheel so as to effectively inhibit relative rotation therebetween.

Additionally, the present invention provides a novel method of retaining center radial ends of spoke members of a vehicle wheel.

A feature of the invention is an arrangement for retaining spoke members in spoked wheel trim.

Another feature of the present invention is an integrally fabricated retainer plate comprised of plastic which incorporates a central anti-rotation and retention arrangement therewith.

An important advantage of the retainer plate is in addition to being lighter weight and less expensive to fabricate allows easier assembly of a spoked wheel trim member.

Additional advantages and features of the present invention will become apparent from the subsequent description and the appended claims taken in conjunction with the accompanying drawings wherein:

FIG. 1 is an enlarged cross-section view in elevation of a simulated wire wheel trim assembly shown installed to a vehicle wheel;

FIG. 2 is an enlarged view of a spring clip for resisting rotation of the wheel trim assembly circumference relative to the vehicle wheel;

FIG. 7 is a section view taken along line 7—7 of FIG. 5 showing the plastic retainer plate and a lock collar integrally formed in the central portion thereof;

Figure 3:
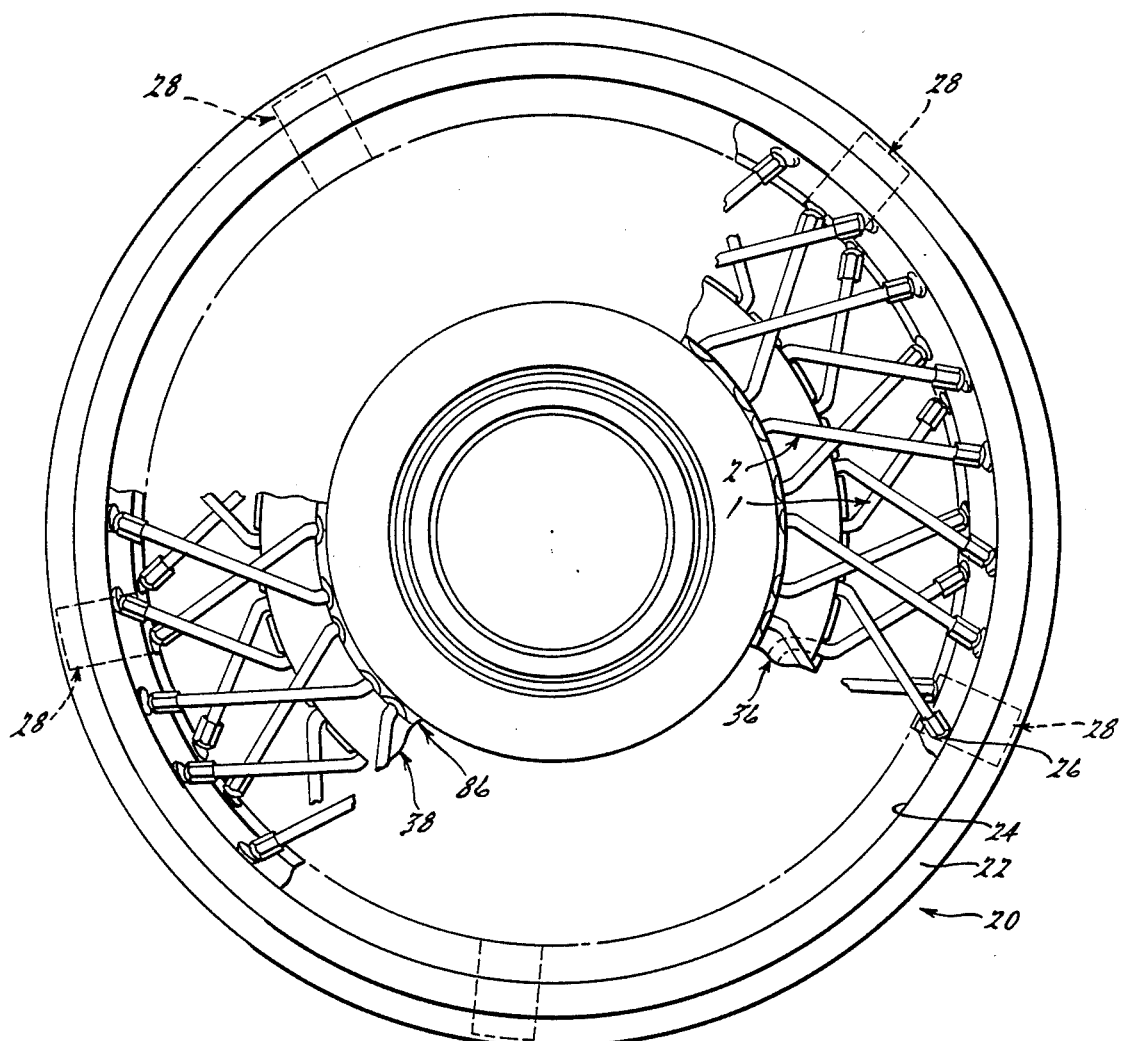
FIG. 3 is a fragmentary plan view of a portion of the simulated wire wheel trim assembly as seen looking in an axially inwardly direction.
Figure 4:
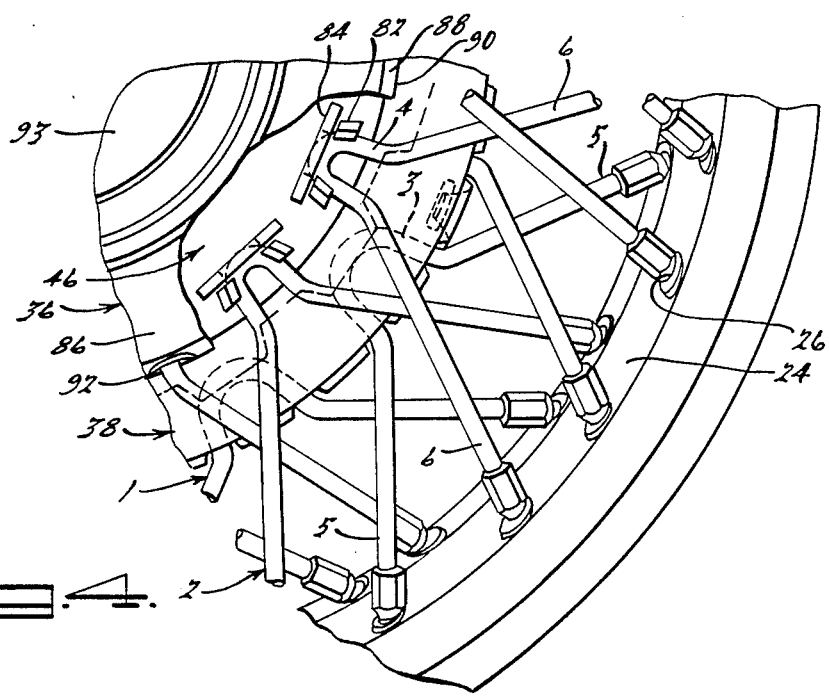
FIG. 4 is a fragmentary plan view of the wheel trim shown in FIG. 3 with portions broken away to show a center retainer plate comprised of a plastic material and in accordance with the present invention.
Figure 5:
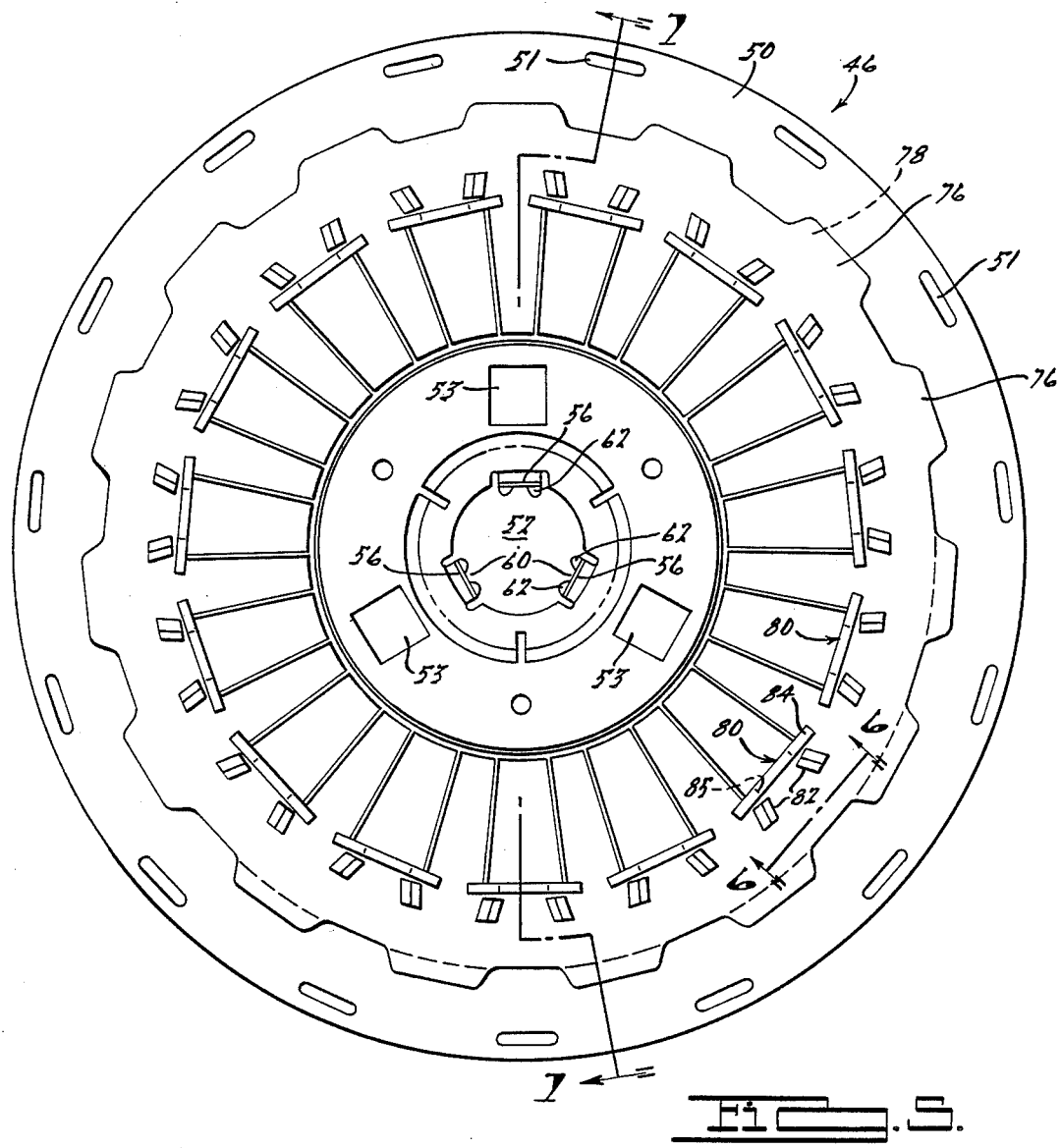
FIG. 5 is a plan view of the retainer plate.
Figure 6:
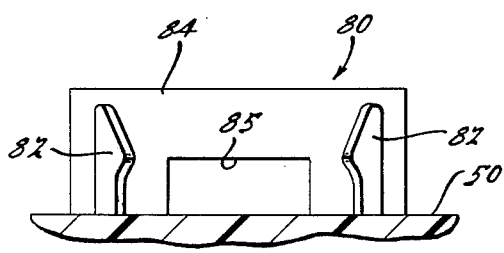
FIG. 6 is an elevation view taken along line 6—6 of the retainer plate shown in FIG. 5.

Referring now to the drawings there is illustrated a simulated wire wheel trim assembly indicated generally at 20 which is designed to be secured to a vehicle wheel 10 by means of a center anti-theft retention system. As used herein, the terms "axially" and "radially" are with respect to the axis "A" (see FIG. 1) of the vehicle axle having mounted thereon the wheel 10 to which the wheel trim assembly of this invention is attached. Vehicle wheel 10 includes an irregularly shaped radial shoulder 12 having radially inwardly facing surface 14, and an axially outwardly extending externally threaded shaft or spindle 16. A tool 18 (shown in phantom) is used to secure the assembly to the wheel.

Simulated wire wheel trim 20 comprises an outer annular ring assembly 22, an inner center hub assembly 36 interconnected by a plurality of generally radially extending spoke members 1, 2 arranged to define axially inner and outer layers at their radially inner ends 3, 4 and including radially outer ends 5, 6, a center lock nut 64 adapted to be secured to an axially outwardly facing spindle of the vehicle wheel and journalled for rotation within the inner center hub assembly, and anti-rotation means for inhibiting relative rotation of the wheel trim with respect to the vehicle wheel. Each spoke member is gull-shaped such that each includes a pair of outer ends and a single nose-shaped inner end.

Outer annular ring assembly 22 includes a frusto-conical side wall 24 facing radially inwardly and including angularly spaced openings 26 for receiving the radially outer ends 5, 6 of the inner and outer layers of spoke members 1, 2. A plurality of substantially identical irregularly shaped centering clips 28 extend around the side wall each centering clip aiding in centering and in resisting rotation of the wheel trim circumference with respect to the vehicle wheel. The clip 28 is generally U-shaped to define an axially extending flange 30 with axial ribs 32 thereof being adapted to frictionally engage radial shoulder 12 of the vehicle wheel. Further, opposite edges of the flange are lanced to define a sharp protrusion 34 adapted to bite into the radial shoulder whereby to inhibit rotation of the wheel trim relative thereto.

Center hub assembly 36 comprises axially outer and inner spoke retainer plates 38, 46 which are designed to be secured together and cooperate to secure the radially inner ends 3 of the axially inner layer of spoke members 1. An axially outer retainer member 86 is also provided which is positioned in overlying relationship to the axially outer spoke retainer plate 46 and is secured thereto by spring clips 87 and cooperates therewith to clamp the radially inner ends 4 of the axially outer layer of spoke members 2.

The axially outer spoke retainer plate 38 is generally circular in shape and has a generally frusto-conically extending radially outwardly facing side wall 40, a radially outer edge 41 thereof being provided with tab portions 42 which are bent axially inwardly and upwardly and about the inner spoke retainer plate 46 and a radially inner edge 39 superposed by the axially outer retainer member 86. The side wall 40 is provided with an annular array of openings 44 in circumferentially spaced relationship therearound each sized so as to loosely accommodate a respective radially inner end 3 of the axially inner layer of spoke members 1.

Axially inner spoke retainer plate 46 is of generally circular configuration and includes an axially inner surface 48, an axially outer surface 50 and a relatively large diameter central opening 52 extending between its surfaces and through which the lock nut 64 is designed to pass. In accord with this invention retainer plate 46 is integrally molded of a suitable polymer such as ABS plastic, and more particularly Nypel 2360. In this construction, a center retention arrangement for resisting rotation of the lock nut is conveniently disposed axially inwardly of the plate thereby enhancing axial compactness of the wheel trim and a spoke retention structure is provided for ease of captivating receipt of the axially inner and outer ends 3, 4 from the respective layers of spoke members 1, 2. Retainer plate 46 includes around its circumference a plurality of spaced slots 51 each adapted to cooperate with the tab portions 42 to clamp the spoke retainer plates together. Further, three off-center openings 53 cooperate with spring clips 87 from the axially outer retainer member 86 to clamp the respective plates together.

With respect to the center retention or lock bracket arrangement for resisting trim rotation, three equiangularly spaced, axially extending, integrally formed generally rigid support beams 54 are adjacent the central opening 52 each team extending perpendicularly from the axially inner surface 48 and each being U-shaped in cross-section so as to include a laterally deflectable spring beam 56 the free end 58 thereof being radially deflectable. The free end portion of each spring beam includes interengaging means in the form of a detent 60 between pair of generally axially extending angularly spaced ribs 62. Each rib 62 has a pair of angularly disposed faces that are acutely angled relative to a radius from the axis "A" so as to define leading and trailing cam faces.

The lock nut 64 is generally cylindrical and includes axial front and rear faces 63, 65, an annular shoulder 66 medially of the faces, a shaped combination recess 67 extending axially inwardly from the rear face, a threaded recess 69 extending axially inwardly from the front face for connecting engagement to the shaft 16, and a plurality of radially outwardly extending ribs 68 each extending axially between the annular shoulder and the front face. Each rib 68 has a pair of angularly disposed faces that are acutely angled relative to a radius from the axis "A" so as to define leading and trailing cam faces. The lock nut is designed to fit snugly into the opening 52 of axially inner spoke retainer plate 46 and be journalled for rotation therewithin.

The outside diameter of the lock nut is slightly greater than the diameter defined by inward radial extension of the ribs 62 on the spring beams when the beams are in their undeflected state. The ribs 68 on the nut extend radially outward and periodically engage the ribs 62 on the spring beam 56 whereby the ribs cooperate to inhibit rotation. The ribs 68 on the nut are adapted to fit interiorly of the detent 60 and so dimensioned as to not engage or radially deflect the spring beam and thus do not place a preload on the plastic spring beam. This is an important consideration in that under severe change of temperature if the ribs on the lock nut were to leave the spring team deflected and overstressed, cracking of the beam could result. The shape of the ribs on the spring beam and/or lock nut are such that if the lock nut rib engages the peak of a spring beam rib, the lock nut rib will be cammed so as to fall either within the detent and not stress the spring beam or fall to the other side of the spring beam rib. The ribs 62, 68 could have their leading cam faces less acutely angled than their trailing cam faces whereby to permit assembly rotation more easily than disassembly rotation. When the lock nut has been threadedly advanced onto the shaft, reverse rotation is inhibited by the ribs 68 on the lock nut advancing against the ribs 62 on the spring beam.

Preferably, and in accord with this invention, three equiangularly disposed spring beams 56 with their associated ribs 62 are provided to resist rotation of four equiangularly disposed ribs 68 on the lock nut 64. An unsymmetrical configuration or arrangement wherein there are a greater number of ribs 68 than spring beams assures that the ribs 68 will have their greatest effect in inhibiting rotation. Assembly and removal of the lock nut is shown in FIG. 1 by the tool 18 having a specially configured end to engage with the combination recess therewithin.

Figure 8:
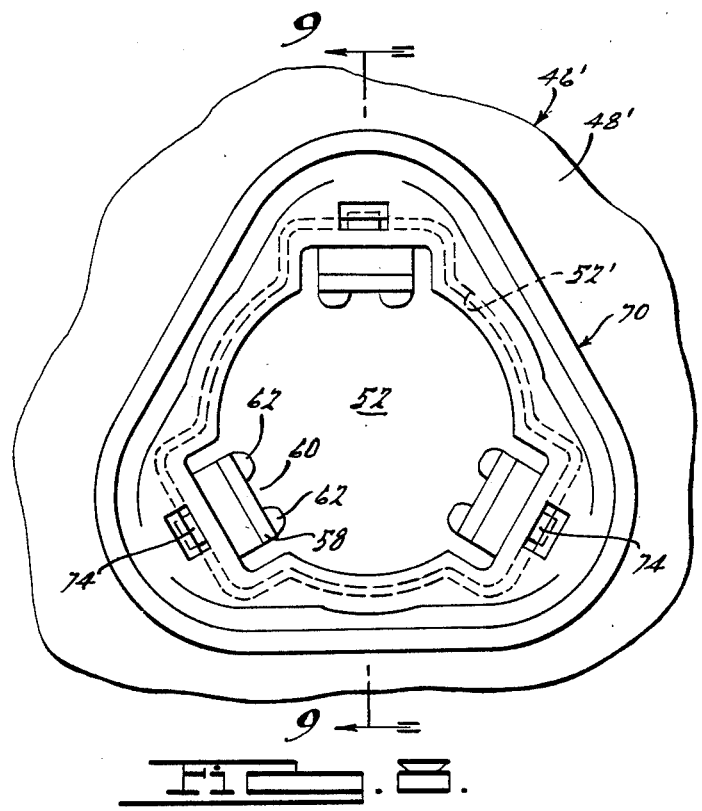
FIG. 8 is a plan view of a plate member receiving in an aperture thereof a separate lock collar.
Figure 9:
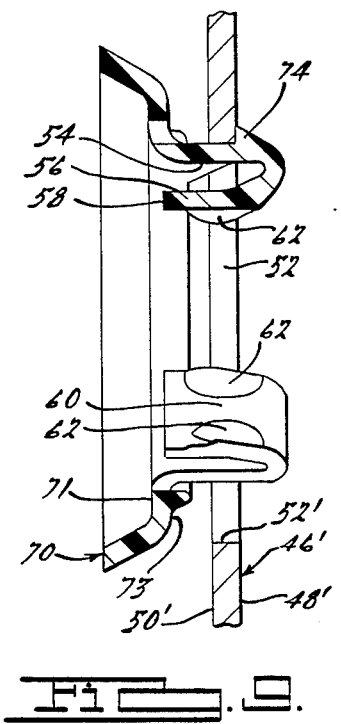
FIG. 9 is a section taken along line, 9—9 of FIG. 8 showing the lock collar disposed in the plate member.
Figure 10:
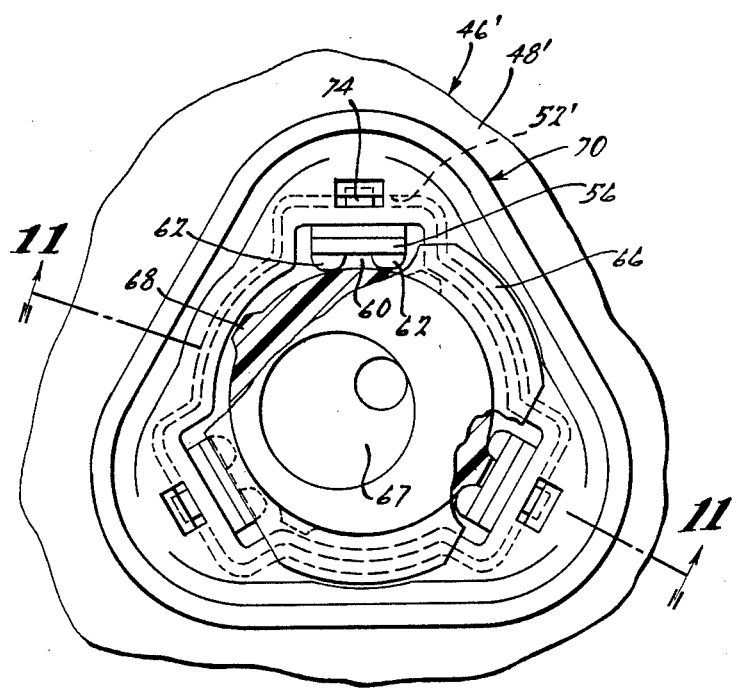
FIG. 10 is a plan view similar to FIG. 10 showing a lock nut disposed within the lock collar.
Figure 11:
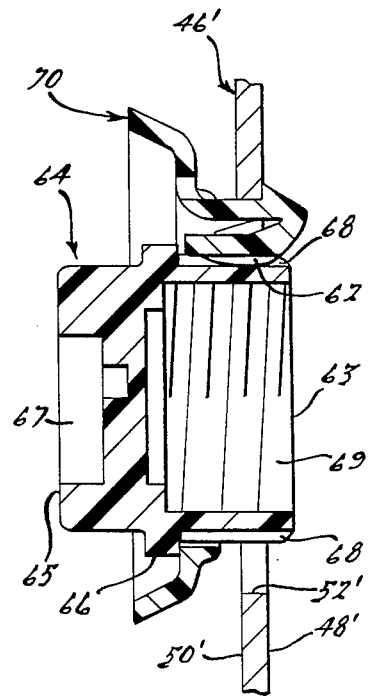
FIG. 11 is a cross-section view taken along line 11—11 of FIG. 10.

While an integral rotation resisting center retention is shown, it is to be understood that a separately provided lock collar 70 could be nonrotatably snap fit into an opening 52' of an inner spoke retaining plate 46' and that this lock collar would receive the lock nut 64. As shown in FIGS. 8-11, the lock collar has a shaped shoulder including an axially inner surface 73 adapted to engage axially outer surface 50' of the plate, an axially outer surface 71 adapted to be engaged by the shoulder 66 of the lock nut, opening 52 extending between the surfaces 71, 73 and the support beam 54 including a retention lance 74 to abut the axially inner surface 48' and prevent the lock collar from coming out of the opening 52'. The support beam 54 allows axial reciprocation of the lock collar within opening 52' with axially inner surface 73 limiting inward axial movement of the lock collar. In all other respects, the spring beams 56 and opening 52 cooperate to receive and inhibit rotation of the lock nut as hereinabove described. Advantageously, such a lock collar could be used in retrofitting as desired into other wheel trim assemblies.

With respect to the retention structure for the spoke members 1, 2, the axially inner spoke retainer plate 46 has on a radially outward skirt portion of its axially outer surface 50 a plurality of equiangularly spaced radially extending tab portions 76 that define radial recesses 78 for captivating the U-shaped noses 3 of the axially inner layers of spoke members 3. Further a plurality of equiangularly spaced spoke retention cages 80 are provided for captivating the U-shaped noses 4 of the axially outer layer of spoke members 2. The spoke retention cages include a pair of upstanding first walls 82 each disposed at an acute angle to a radius drawn from center axis of the plate and a radially deflectable second wall 84 generally perpendicular to the radius and disposed between the first walls, each of the walls 82, 84 being generally perpendicular to axially outer surface 50. A rectangularly shaped slot 85 in second wall 84 is adapted to receive the inward radial nose 4 of the axially outer layer of spoke members 2.

Outer retainer member 86 is generally cup-shaped and includes a frusto-conical wall 88 including a plurality of circumferentially spaced radial slots 92 each disposed axially outwardly from an axially inner and radially outer peripheral edge 90 thereof and through which the radially inner ends 4 of the axially outer layer of spoke members 2 are designed to project, three radially inward spring clips 87 to be received in openings 51 of retention plate 46 and an axially outer and radially inner peripheral edge 94 defining a central opening 93 and including spaced openings 91.

A medallion 96 having spring clips 98 extending axially inward therefrom are adapted to be releasably captivated in the openings 91 such that the medallion will cover and limit access to the lock nut 64. One end 19 of the tool 18 is used to pry the medallion off of the wheel cover.

In practice the following steps are used to assemble a wheel trim according to the present invention. Position radially outer ends 5 of the axially inner layer of spokes 1 into some of the spoke mounting openings 26 of the outer annular ring assembly 22. Position the integrally formed plastic inner spoke retainer plate 46 on the center axis of the annular ring 22 such that the spoke retainer recesses 78 are positioned relative to radial inward ends 3 of the spokes 1. The radial inward ends 3 of the inner layer of spokes 1 are positioned on the axially outer surface 50 of plastic retainer plate 46 whereupon the plate is lifted axially upward and rotated whereby to drive each radially inward end 3 of the spokes 1 into clamping relationship between a respective recess 78 formed by the pieces of plastic 76, 50. Place the axially outer spoke retainer plate 38 thereover such that the radially inner ends 3 of the spokes 1 are within the openings 44. The three spring tabs 42 are deformably bent around into slots 51 and secured to the axially outer spoke retention member.

The radially outer ends 6 of the axially outer spokes 2 are loaded into the other openings 26 of the outer annular ring assembly 22 and the radially inner ends 4 are pushed axially inward (i.e., downwardly) between the first walls 82 which function to guide the nose of ends 4 against the second wall 84 which radially deflects and allows the nose ends 4 to be snapped in and captivated in the opening 85 thereof. Position the axially outer retainer member 86 such that the slots 92 are passed over radially inner ends 4 of the spokes 2 and its central spring beam 87 snapped into the off-center openings 53.

While it will be apparent that the preferred embodiment of the invention disclosed is well calculated to provide the advantages and features above stated, it will be appreciated that the invention is susceptible to modification, variation and change without departing from the proper scope or fair meaning of the subjoined claims.

What is claimed is:

1. In a simulated wire wheel trim of the type including an outer annular ring assembly, a center hub assembly, and a plurality of generally radially extending spokes the inner and outer radial ends of each engaging a respective assembly, said center hub assembly comprising a rotatable retention member for engaging the vehicle wheel, an axially inner spoke retainer plate, an axially outer spoke retainer plate, and means for securing said spoke retainer plates together characterized in that said axially inner spoke retainer plate has integrally formed therewithin means engageable with said rotatable retention member for inhibiting rotation of said retention member relative to said vehicle wheel.

2. The simulated wire wheel trim as recited in claim 1 wherein said spoke retainer plate has integrally formed therewith retention means for captivating the inner radial ends of said spoke members.

3. The simulated wire wheel trim as recited in claim 2 wherein said retention means comprises a first and a second plurality of retention recesses each disposed on a respective diameter and defining an axially inner layer of spoke members and an axially outer layer of spoke members.

4. The simulated wire wheel trim as recited in claim 3 wherein one said plurality of recesses include retention cages each for securely captivating the inner radial end of its respective spoke member.

5. The simulated wire wheel trim as recited in claim 4 wherein one of said plurality of recesses includes a plurality of generally radially outwardly extending tab members each extending radially and cooperating to define radial recesses to receive and captivate one end of said inner layer of axially extending spoke members.

6. A simulated wire wheel trim as recited in claim 1 wherein said axially inner spoke retainer plate is fabricated from a polymeric composition.

7. A simulated wire wheel trim as recited in claim 1 wherein said means for inhibiting rotation of said retention member include a plurality of circumferentially spaced spring bars extending into a central opening provided in said axially inner spoke retainer plate.

8. A wheel trim assembly for attachment to a vehicle wheel having a shaft extending axially outwardly therefrom for connecting engagement by a lock nut rotatably disposed on the wheel trim assembly, comprising a one-piece retention plate including integral means engageable with said lock nut for inhibiting rotation of the lock nut, said plate having an axially outer and inner surface and a central opening therethrough, said means for inhibiting rotation including at least one spring beam extending generally between the vehicle wheel and the axially outer surface of said retention plate and adapted to deflect radially upon engagement with a rib extending radially from the lock nut.

9. The wheel trim assembly as recited in claim 8 wherein a support beam extends axially from the inward axial surface of said retention plate and said spring beam has one end connected to the inward extension of the support beam and its deflectable end adjacent the opening of said plate.

10. A wheel trim assembly as recited in claim 8 wherein said one piece retention plate is fabricated from a polymeric composition.

11. A wheel trim assembly as recited in claim 8 wherein said rotation inhibiting means is disposed axially inwardly of the axially outer surface of said retention plate.

12. A wheel trim assembly for attachment to a vehicle wheel having a shaft extending axially outwardly therefrom for connecting engagement by a lock nut rotatably disposed on the wheel trim assembly, comprising a one-piece retention plate including integral means for inhibiting rotation of the lock nut, said plate having an axially outer and inner surfaces and a central opening therethrough and being centrally depressed axially inwardly in an area circumjacent to said opening, said means for inhibiting rotation including at least one spring beam extending generally between the vehicle wheel and the axially outer surface of said retention plate, said lock nut including a radial shoulder and a plurality of radial ribs, said shoulder being adapted to engage the axially outer surface of said depression, and said ribs extend from the shoulder axially inwardly through said opening, each said rib being adapted to engage and radially deflect the spring beam to inhibit rotation of the lock nut.

13. A wheel trim assembly for attachment to a vehicle wheel having a shaft extending axially outwardly therefrom for connecting engagement by a lock nut rotatably disposed on the wheel trim assembly, comprising a one-piece retention plate including integral means for inhibiting rotation of the lock nut, said plate having axially outer and inner surfaces and a central opening therethrough, said means for inhibiting rotation including at least one spring beam extending generally between the vehicle wheel and the axially outer surface of said retention plate, said spring beam including a radial face disposed substantially on a diameter defining the opening of said plate and a pair of angularly separated protuberances each extending radially inwardly from said radial face, said lock nut including a radially extending rib, said protuberances each being engageable by said rib whereby to inhibit rotation of said lock nut.

14. A wheel trim assembly for attachment to a vehicle wheel having a shaft extending axially outwardly therefrom for connecting engagement by a lock nut rotatably disposed on the wheel trim assembly, comprising a one-piece retention plate including integral means engageable with said lock nut for inhibiting rotation of the lock nut a generally circular outer ring and a plurality of radially extending spoke members the outer ring securing the radial outer ends of said spoke members, said retention plate being contoured to define first retention means for retaining the radial inner ends of some of said spoke members and second retention means for retaining the radial inner ends of other of said spoke members.

15. The wheel trim assembly as recited in claim 14 wherein said first and second retention means dispose the inner radial ends of said spoke members on axially inner and outer planes relative to an axis through the retention plate.

16. The wheel trim assembly as recited in claim 14 wherein said first retention means comprise a plurality of angularly spaced radially extending tabs each forming a recess for receiving the inner radial end of a respective spoke member.

17. The wheel trim assembly as recited in claim 14 wherein said second retention means comprise a plurality of angularly spaced retention cages each including a slotted axially extending wall, the slot being dimensioned to captivate the radial end of its respective spoke member.

* * * * *